United States Patent

Hoang et al.

(10) Patent No.: US 6,750,303 B2
(45) Date of Patent: Jun. 15, 2004

(54) FUNCTIONAL ORGANIC PARTICLES FOR CATALYSTS SUPPORTS

(75) Inventors: Peter Phung Minh Hoang, Calgary (CA); Charles Russell, Calgary (CA); Jason Roy Kearns, Calgary (CA); Sieghard E. Wanke, Edmonton (CA); David T. Lynch, Edmonton (CA); Nai-Hong Li, Edmonton (CA)

(73) Assignee: The Governors of the University of Alberta (CA)

( * ) Notice: Subject to any disclaimer, the term of this patent is extended or adjusted under 35 U.S.C. 154(b) by 0 days.

(21) Appl. No.: 10/427,027

(22) Filed: Apr. 30, 2003

(65) Prior Publication Data

US 2003/0199389 A1 Oct. 23, 2003

Related U.S. Application Data

(62) Division of application No. 09/728,843, filed on Dec. 1, 2000, now Pat. No. 6,583,082.

(51) Int. Cl.$^7$ .............................. C08F 4/44; B01J 31/38
(52) U.S. Cl. ..................... 526/89; 526/128; 526/160; 526/161; 526/171; 526/317.1; 526/320; 526/336; 526/347; 526/348.6; 526/943; 502/109; 502/117; 502/152; 502/155
(58) Field of Search ................... 502/109, 117, 502/152, 155; 526/89, 128, 160, 161, 171, 317.1, 320, 336, 347, 348.6

(56) References Cited

U.S. PATENT DOCUMENTS

| | | | | |
|---|---|---|---|---|
| 4,407,727 A | 10/1983 | Harris et al. | ................ | 502/115 |
| 4,623,707 A | 11/1986 | Bedell et al. | ................ | 526/142 |
| 4,632,912 A | 12/1986 | Bedell et al. | ................ | 502/122 |
| 4,900,706 A | 2/1990 | Sasaki et al. | ................ | 502/116 |
| 5,118,648 A | 6/1992 | Furtek et al. | ................ | 502/116 |
| 5,139,985 A | 8/1992 | Barbe' et al. | ................ | 502/109 |
| 5,168,104 A | 12/1992 | Li et al. | ......................... | 521/64 |
| 5,362,824 A | 11/1994 | Furtek et al. | ................ | 526/114 |
| 5,434,116 A | 7/1995 | Sone et al. | .................. | 502/103 |
| 5,461,017 A | * 10/1995 | Furtek et al. | ................ | 502/109 |
| 5,463,000 A | 10/1995 | Miyoshi et al. | ............. | 526/119 |
| 5,498,582 A | 3/1996 | Krause et al. | .............. | 502/103 |
| 5,554,775 A | 9/1996 | Krishnamurti et al. | ......... | 556/7 |
| 5,637,659 A | 6/1997 | Krishnamurti et al. | ...... | 526/133 |

FOREIGN PATENT DOCUMENTS

| | | |
|---|---|---|
| EP | 344755 | 12/1989 |
| JP | 67407 | 9/1997 |
| WO | WO 96/35726 | 11/1996 |

* cited by examiner

*Primary Examiner*—Robert D. Harlan
(74) *Attorney, Agent, or Firm*—Kenneth H. Johnson

(57) ABSTRACT

Functional polymers containing hydroxyl groups as supports for use with catalysts can increase the activity of these catalysts which results in improved ethylene polymerization. The present invention seeks to provide catalysts with improved activity by incorporating 2-hydroxyethyl methacrylate (HEMA) into the support of the catalyst.

14 Claims, No Drawings

FUNCTIONAL ORGANIC PARTICLES FOR CATALYSTS SUPPORTS

This is a division, of application Ser. No. 09/728,843 filed on Dec. 1, 2000 now U.S. Pat. No. 6,583,082.

FIELD OF THE INVENTION

The present invention relates to polymeric supports suitable for use in association with catalysts, preferably single site type catalysts, activated with aluminoxane. Particularly the supports contain functional groups.

BACKGROUND OF THE INVENTION

There are a number of patents that disclose the use of polymeric supports of olefin polymerization catalysts. Generally the supports are polyolefins as illustrated for example by Atlantic Richfield's U.S. Pat. No. 4,407,727; Quantum's WO 96/35726; and the abstract of Mitsubishi's JP 67407. Polyethylene and polypropylene are not polymers prepared from $C_{4-12}$ vinyl monomers and thus the references do not teach or disclose the subject matter of the present patent application.

There are a fairly large number of patents which teach using polymeric supports comprising styrene optionally a cross-linking agent such as divinyl benzene and/or polymeric supports such as poly(methyl methacrylate). These patents are illustrated by U.S. Pat. Nos. 4,623,707; 4,623,912; 5,139,985; 4,900,706; 5,463,000; 5,118,648; 5,498,582; and EP 344 755.

The closest art Applicants are aware relevant to the subject matter of the present patent application are U.S. Pat. No. 5,362,824 issued Nov. 8, 1994 and U.S. Pat. No. 5,461,017 issued Oct. 24, 1995 both to Furtek et al., assigned to Mobil. The patent teaches a polymeric support comprising about 30% of divinyl benzene, about 55% of styrene and about 15% of acetoxy or hydroxy styrene. The support may be used in association with a metallocene catalyst and aluminoxane as an activator. The reference does not suggest functional monomers selected from the group consisting of $C_{1-8}$ hydroxy esters of $C_{3-6}$ ethylenically unsaturated carboxylic acids, chloride derivatives thereof, chlorostyrene and $C_{1-8}$ straight chain, branched or cyclic amines which are unsubstituted or substituted by up to two $C_{1-4}$ alkyl radicals at the nitrogen atom.

SUMMARY OF THE INVENTION

The present invention provides a functionalized polymeric support for use in association with a catalyst system comprising a co-catalyst of the formula $R^1{}_2AlO(R^1AlO)_m AlR^1{}_2$ wherein each $R^1$ is independently selected from the group consisting of $C_{1-20}$ hydrocarbyl radicals and m is from 3 to 50, said support comprising the suspension or emulsion polymerization product of a feedstock comprising:

(i) from 0 to 95 weight % of one or more $C_{4-12}$ vinyl monomers;

(ii) from 50 to 2 weight % of a crosslinking agent; and (iii) from 70 to 3 weight % of a functionalized monomer containing a reactive functional group selected from the group consisting of $C_{1-8}$ hydroxy esters of $C_{3-6}$ ethylenically unsaturated carboxylic acids, chloride derivatives thereof, chlorostyrene and $C_{1-8}$ straight chain, branched or cyclic amines which are unsubstituted or substituted by up to two $C_{1-4}$ alkyl radicals at the nitrogen atom; the sum of the weight % of said monomers being 100 weight %, and having a particle size from 0.1 to 1000 microns, surface area of greater than 10 m²/g and a pore volume of at least 0.2 cc/g of support.

A further aspect of the present invention provides a supported co-catalyst of the formula $R^1{}_2AlO(R^1AlO)_m AlR^1{}_2$ wherein each $R^1$ is independently selected from the group consisting of $C_{1-20}$ hydrocarbyl radicals and m is from 3 to 50 on the above functional support, wherein the co-catalyst is present on the support in an amount from 0.01 to 0.8 g per g of support.

A further aspect of the present invention provides a catalyst system comprising the above supported co-catalyst, together with a catalyst of the formula:

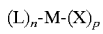
$$(L)_n\text{-}M\text{-}(X)_p$$

wherein M is a transition metal; L is a monoanionic ligand independently selected from the group consisting of a cyclopentadienyl-type ligand, a bulky heteroatom ligand and a phosphinimine ligand; X is an activatable ligand; n may be from 1 to 3; and p may be from 1 to 3, provided that the sum of n+p equals the valence state of M, and further provided that two L ligands may be bridged by a silyl radical or a $C_{1-4}$ alkyl radical to provide a molar ratio of aluminum to transition metal from 5:1 to 1000:1.

A further aspect of the present invention provides a supported catalyst comprising the above noted support, and a catalyst of the formula:

$$(L)_n\text{-}M\text{-}(X)_p$$

wherein M is a transition metal; L is a monoanionic ligand selected independently from the group consisting of a cyclopentadienyl-type ligand, a bulky heteroatom ligand and a phosphinimine ligand; X is an activatable ligand; n may be from 1 to 3; and p may be from 1 to 3, provided that the sum of n+p equals the valence state of M, and further provided that two L ligands may be bridged by a silyl radical or a $C_{1-4}$ alkyl radical.

A further aspect of the present invention provides the above noted catalyst system together with a co-catalyst of the formula $R^1{}_2AlO(R^1AlO)_m AlR^1{}_2$ wherein each $R^1$ is independently selected from the group consisting of $C_{1-20}$ hydrocarbyl radicals and m is from 3 to 50.

A further aspect of the present invention provides a catalyst system comprising a mixture of a catalyst of the formula:

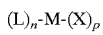
$$(L)_n\text{-}M\text{-}(X)_p$$

wherein M is a transition metal; L is a monoanionic ligand selected from the group consisting of a cyclopentadienyl-type ligand, a bulky heteroatom ligand and a phosphinimine ligand; X is an activatable ligand; n may be from 1 to 3; and p may be from 1 to 3, provided that the sum of n+p equals the valence state of M, and further provided that two L ligands may be bridged by a silyl radical or a $C_{1-4}$ alkyl radical and a co-catalyst of the formula $R^1{}_2AlO(R^1AlO)_m AlR^1{}_2$ wherein each $R^1$ is independently selected from the group consisting of $C_{1-20}$ hydrocarbyl radicals and m is from 3 to 50 to provide a molar ratio of aluminum to transition metal from from 5:1 to 1000:1 on the above noted support.

A further aspect of the present invention provides the above noted catalyst systems in a gas phase or slurry polymerization, preferably for olefins.

DETAILED DESCRIPTION

The feedstock for the polymeric supports of the present invention comprises:

(i) from 0 to 95, preferably from 60 to 80, weight % of one or more $C_{4-12}$ vinyl monomers;

(ii) from 50 to 2, preferably from 25 to 10, weight % of a crosslinking agent; and (iii) from 70 to 3, preferably from 65 to 15, most preferably from 60 to 15, desirably from 50 to 15 weight % of a functionalized monomer containing reactive functional group selected from the group consisting of $C_{1-8}$ hydroxy esters of $C_{3-6}$ ethylenically unsaturated carboxylic acids, chloride derivatives thereof, chlorostyrene and $C_{1-8}$ straight chain, branched or cyclic amines which are unsubstituted or substituted by up to two $C_{1-4}$ alkyl radicals at the nitrogen atom; the sum of the weight % of said monomers being 100 weight %.

Some vinyl monomers include styrene, alpha-methyl styrene, para-methyl styrene and $C_{1-4}$ alkyl esters of $C_{3-6}$ unsaturated carboxylic acids. The styrenic monomers such as styrene, alpha-methyl styrene, para-methyl styrene may also be referred to as vinyl aromatic monomers. Some $C_{1-4}$ alkyl esters of $C_{3-6}$ unsaturated carboxylic acids include methyl methacrylate, ethyl methacrylate, butyl methacrylate, methyl acrylate, ethyl acrylate and butyl acrylate.

Some crosslinking agents include divinyl benzene, divinyl toluene, di- and tri-acrylates and di- and tri-methacrylates such as pentaerythritol trimethacrylate.

Some functionalized monomers include 2-hydroxyethyl acrylate, 2-hydroxyethyl methacrylate and pyridine.

The functionalized polymeric supports may be prepared by conventional suspension polymerization techniques. These are well known to those skilled in the art. Generally the monomers are dispersed in water as continuous phase using one or more surfactant or suspending agents which may be ionic such as long chain (e.g. $C_{12-18}$) fatty acids or derivatives thereof (e.g. sulfonates) and salts thereof such as for example, dodecyl benzene sulfonate, or a non ionic surfactant such as polyoxyethylene sorbitan fatty acid esters (such as those sold under the trademark TWEEN). Typically the emulsion also contains a free radical initiator (such as persulfates (optionally in the presence of a reducing agent) or peroxides). The emulsion is heated to begin polymerization and the polymerization may be completed in a batch process.

The selection of the surfactants to some extent controls the particle size of the final particles in the emulsion polymerization.

Generally the polymeric particles will have a particle size from 0.1 to 1000, preferably from 10 to 300 microns, surface area of greater than 10, preferably from 100 to 1500 $m^2/g$ and a pore volume of at least 0.2, preferably at least 0.6 cc/g of support.

There are several methods which may be used to increase the pore size/volume in the polymeric particles. For example silica may be incorporated into the polymer then dissolved out using a strong base. Silica impregnated with a blowing agent may be incorporated into the polymeric particles and then the blowing agent may be activated. The residual silica may again be dissolved from the polymer particles. This technique is disclosed in U.S. Pat. No. 5,168,104 issued Dec. 1, 1992 to Li et al.

The co-catalysts useful in the present invention are aluminoxanes also sometimes called alumoxanes. The aluminoxane compounds of the present invention have the formula I: $R^1{}_2AlO(R^1AlO)_m AlR^1{}_2$ wherein each $R^1$ is independently selected from the group consisting of $C_{1-20}$ hydrocarbyl radicals and m is from 3 to 50, preferably from 3 to 30, most preferably from 5 to 30. Most preferably $R^1$ is selected from the group consisting of $C_{1-6}$, most preferably $C_{1-4}$ straight chained or branched alkyl radicals. Suitable alkyl radicals include a methyl radical, an ethyl radical, an isopropyl radical and an isobutyl radical. In some commercially available aluminoxanes $R^1$ is a methyl radical.

In one aspect of the present invention the co-catalyst may be supported on the support in an amount from 0.01 to 0.8, preferably from 0.01 to 0.4, most preferably from 0.02 to 0.3 g per g of support (e.g. 1 to 80, preferably 1 to 40, most preferably 2 to 30 weight %).

In a further aspect the present invention the supported co-catalyst may be used in conjunction with a single site catalyst.

Typically the catalysts used with the aluminoxane, prepared in accordance with the present invention, comprise a transition metal complex of at least one $C_{5-13}$ ligand containing a 5-membered carbon ring having delocalized bonding within the ring and bound to the metal atom through covalent $\eta^5$ bonds; and said ligand being unsubstituted or up to fully substituted with one or more substituents as described below.

Generally the catalyst may be a single site type catalyst typically comprising a transition metal, preferably an early transition metal (e.g. Ti, V, Zr and Hf) and generally having two bulky ligands. In many of the well known single site catalysts typically one of the bulky ligands is a cyclopentadienyl-type ligand. These cyclopentadienyl-type ligands comprise a $C_{5-13}$ ligand containing a 5-membered carbon ring having delocalized bonding within the ring and bound to the metal atom through covalent $\eta^5$ bonds which are unsubstituted or may be further substituted (sometimes referred to in a short form as Cp ligands). Cyclopentadienyl-type ligands include unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl-type ligand includes the group consisting of $C_{1-10}$ hydrocarbyl radicals (including phenyl and benzyl radicals), which hydrocarbyl substituents are unsubstituted or further substituted by one or more substituents selected from the group consisting of a halogen atom, preferably a chlorine or fluorine atom and a $C_{1-4}$ alkyl radical; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R)_3$ wherein each R is independently selected from the group consisting of hydrogen, a $C_{1-8}$ alkyl or alkoxy radical, and $C_{6-10}$ aryl or aryloxy radicals; and germanyl radicals of the formula —Ge—$(R)_3$ wherein R is as defined directly above.

If there are two such bulky ligands (i.e. bis-Cp) the catalysts are metallocene-type catalysts. The Cp ligand may be bridged to another Cp ligand by a silyl bridge or a short chain ($C_{1-4}$) alkyl radical. The Cp-type ligand may be bridged to an amido radical which may be further substituted by up to two additional substituents. Such bridged complexes are sometimes referred to as constrained geometry catalysts.

Broadly, the transition metal complex (or catalyst) suitable for use in the present invention has the formula:

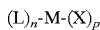

wherein M is a transition metal preferably selected from the group consisting of Ti, V, Zr, Hf, Cr, Fe, Co, Ni and Pd, most preferably selected from the group consisting of Ti, Hf and Zr (as described below); L is a monoanionic ligand independently selected from the group consisting of a cyclopentadienyl-type ligand, a bulky heteroatom ligand (as described below) and a phosphinimine ligand (as described below); X is an activatable ligand which is most preferably a simple monoanionic ligand such as alkyl or a halide (as described below); n may be from 1 to 3, preferably 2 or 3; and p may be from 1 to 3, preferably 1 or 2, provided that the sum of n+p equals the valence state of M, and further provided that two L ligands may be bridged by a silyl radical or a $C_{1-4}$ alkyl radical.

If one or more of the L ligands is a phosphinimine ligand the transition metal complex may be of the formula:

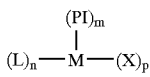

wherein M is a transition metal preferably selected from Ti, Hf and Zr (as described below); Pl is a phosphinimine ligand (as described below); L is a monoanionic ligand selected from the group consisting of a cyclopentadienyl-type ligand or a bulky heteroatom ligand (as described below); X is an activatable ligand which is most preferably a simple monoanionic ligand such as an alkyl or a halide (as described below); m is 1 or 2; n is 0 or 1; and p is an integer fixed by the valence of the metal M (i.e. the sum of m+n+p equals the valence state of M).

In one embodiment the catalysts are group 4 metal complexes in the highest oxidation state. For example, the catalyst may be a bis(phosphinimine)dichloride complex of titanium, zirconium or hafnium. Alternately, the catalyst contains one phosphinimine ligand, one "L" ligand (which is most preferably a cyclopentadienyl-type ligand) and two "X" ligands (which are preferably both chloride).

The preferred metals (M) are from Group 4 (especially titanium, hafnium or zirconium) with titanium being most preferred.

The catalyst may contain one or two phosphinimine ligands which are covalently bonded to the metal. The phosphinimine ligand is defined by the formula:

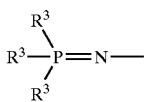

wherein each $R^3$ is independently selected from the group consisting of a hydrogen atom; a halogen atom; $C_{1-20}$, preferably $C_{1-10}$ hydrocarbyl radicals which are unsubstituted by or further substituted by a halogen atom; a $C_{1-8}$ alkoxy radical; a $C_{6-10}$ aryl or aryloxy radical; an amido radical; a silyl radical of the formula:

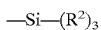

wherein each $R^2$ is independently selected from the group consisting of hydrogen, a $C_{1-8}$ alkyl or alkoxy radical, and $C_{6-10}$ aryl or aryloxy radicals; and a germanyl radical of the formula:

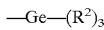

wherein $R^2$ is as defined above.

The preferred phosphinimines are those in which each $R^3$ is a hydrocarbyl radical, preferably a $C_{1-6}$ hydrocarbyl radical. A particularly preferred phosphinimine is tri-(tertiary butyl) phosphinimine (i.e. wherein each $R^3$ is a tertiary butyl group).

Preferred phosphinimine catalysts are Group 4 organometallic complexes which contain one phosphinimine ligand (as described above) and one ligand L which is either a cyclopentadienyl-type ligand or a heteroligand.

As used herein, the term "heteroligand" refers to a ligand which contains at least one heteroatom selected from the group consisting of boron, nitrogen, oxygen, phosphorus or sulfur. The heteroligand may be sigma or pi-bonded to the metal. Exemplary heteroligands include ketimide ligands, silicone-containing heteroligands, amido ligands, alkoxy ligands, boron heterocyclic ligands and phosphole ligands, as all described below.

As used herein, the term "ketimide ligand" refers to a ligand which:

(a) is bonded to the transition metal via a metal-nitrogen atom bond;

(b) has a single substituent on the nitrogen atom (where this single substituent is a carbon atom which is doubly bonded to the N atom); and (c) has two substituents Sub 1 and Sub 2 (described below) which are bonded to the carbon atom.

Conditions a, b and c are illustrated below:

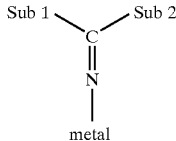

The substituents "Sub 1" and "Sub 2" may be the same or different. Exemplary substituents include hydrocarbyls having from 1 to 20 carbon atoms, silyl groups, amido groups and phosphido groups. For reasons of cost and convenience it is preferred that these substituents both be hydrocarbyls, especially simple alkyls and most preferably tertiary butyl.

Silicon containing heteroligands are defined by the formula:

wherein the — denotes a bond to the transition metal and $\mu$ is sulfur or oxygen.

The substituents on the Si atom, namely $R_x$, $R_y$ and $R_z$ are required in order to satisfy the bonding orbital of the Si atom. The use of any particular substituent $R_x$, $R_y$ or $R_z$ is not especially important to the success of this invention. It is preferred that each of $R_x$, $R_y$ and $R_z$ is a $C_{1-2}$ hydrocarbyl group (i.e. methyl or ethyl) simply because such materials are readily synthesized from commercially available materials.

The term "amido" is meant to convey its broad, conventional meaning. Thus, these ligands are characterized by (a) a metal-nitrogen bond and (b) the presence of two substituents (which are typically simple alkyl or silyl groups) on the nitrogen atom.

The terms "alkoxy" and "aryloxy" is also intended to convey its conventional meaning. Thus, these ligands are characterized by (a) a metal oxygen bond and (b) the presence of a hydrocarbyl group bonded to the oxygen atom. The hydrocarbyl group may be a $C_{1-10}$ straight chained, branched or cyclic alkyl radical or a $C_{6-13}$ aromatic radical which radicals are unsubstituted or further substituted by one or more $C_{1-4}$ alkyl radicals (e.g. 2,6di-tertiary butyl phenoxy).

Boron heterocyclic ligands are characterized by the presence of a boron atom in a closed ring ligand. This definition includes heterocyclic ligands which also contain a nitrogen atom in the ring. These ligands are well known to those skilled in the art of olefin polymerization and are fully described in the literature (see, for example, U.S. Pat. Nos. 5,637,659; 5,554,775; and the references cited therein).

The term "phosphole" is also meant to convey its conventional meaning. "Phospholes" are cyclic dienyl structures having four carbon atoms and one phosphorus atom in the closed ring. The simplest phosphole is $C_4PH_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; or silyl or alkoxy radicals. Phosphole ligands are also well known to those skilled in the art of olefin polymerization and are described as such in U.S. Pat. No. 5,434,116 (Sone, to Tosoh).

The term "activatable ligand" or "leaving ligand" refers to a ligand which may be activated by the aluminoxane (also referred to as an "activator") to facilitate olefin polymerization. Exemplary activatable ligands are independently selected from the group consisting of a hydrogen atom; a halogen atom, preferably a chlorine or fluorine atom; a $C_{1-10}$ hydrocarbyl radical, preferably a $C_{1-4}$ alkyl radical; a $C_{1-10}$ alkoxy radical, preferably a $C_{1-4}$ alkoxy radical; and a $C_{5-10}$ aryl oxide radical; each of which said hydrocarbyl, alkoxy, and aryl oxide radicals may be unsubstituted by or further substituted by one or more substituents selected from the group consisting of a halogen atom, preferably a chlorine or fluorine atom; a $C_{1-8}$ alkyl radical, preferably a $C_{1-4}$ alkyl radical; a $C_{1-8}$ alkoxy radical, preferably a $C_{1-4}$ alkoxy radical; a $C_{6-10}$ aryl or aryloxy radical; an amido radical which is unsubstituted or substituted by up to two $C_{1-8}$, preferably $C_{1-4}$ alkyl radicals; and a phosphido radical which is unsubstituted or substituted by up to two $C_{1-8}$, preferably $C_{1-4}$ alkyl radicals.

The number of activatable ligands depends upon the valency of the metal and the valency of the activatable ligand. The preferred catalyst metals are Group 4 metals in their highest oxidation state (i.e. $4^+$) and the preferred activatable ligands are monoanionic (such as a halide—especially chloride or $C_{1-4}$ alkyl—especially methyl). One useful group of catalysts contain a phosphinimine ligand, a cyclopentadienyl ligand and two chloride (or methyl) ligands bonded to the Group 4 metal. In some instances, the metal of the catalyst component may not be in the highest oxidation state. For example, a titanium (III) component would contain only one activatable ligand.

As noted above, one group of catalysts is a Group 4 organometallic complex in its highest oxidation state having a phosphinimine ligand, a cyclopentadienyl-type ligand and two activatable ligands. These requirements may be concisely described using the following formula for the preferred catalyst:

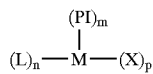

wherein: M is a metal selected from Ti, Hf and Zr; PI is as defined above, but preferably a phosphinimine wherein $R^3$ is a $C_{1-6}$ alkyl radical, most preferably a t-butyl radical; L is a ligand selected from the group consisting of cyclopentadienyl, indenyl and fluorenyl ligands which are unsubstituted or substituted by one or more substituents selected from the group consisting of a halogen atom, preferably chlorine or fluorine; $C_{1-4}$ alkyl radicals; and benzyl and phenyl radicals which are unsubstituted or substituted by one or more halogen atoms, preferably fluorine; X is selected from the group consisting of a chlorine atom and $C_{1-4}$ alkyl radicals; m is 1; n is 1; and p is 2.

In one embodiment of the present invention the transition metal complex may have the formula: $[(CP)_qM[N=P(R^3)]_bX_c$ wherein M is the transition metal; Cp is a $C_{5-13}$ ligand containing a 5-membered carbon ring having delocalized bonding within the ring and bound to the metal atom through covalent $\eta^5$ bonds and said ligand being unsubstituted or up to fully substituted with one or more substituents selected from the group consisting of a halogen atom, preferably chlorine or fluorine; $C_{1-4}$ alkyl radicals; and benzyl and phenyl radicals which are unsubstituted or substituted by one or more halogen atoms, preferably fluorine; $R^3$ is a substituent selected from the group consisting of $C_{1-10}$ straight chained or branched alkyl radicals, $C_{6-10}$ aryl and aryloxy radicals which are unsubstituted or may be substituted by up to three $C_{1-4}$ alkyl radicals, and silyl radicals of the formula $—Si—(R)_3$ wherein R is $C_{1-4}$ alkyl radical or a phenyl radical; L is selected from the group consisting of a leaving ligand; q is 1 or 2; b is 1 or 2; and the valence of the transition metal—(q+b)=c.

The catalysts systems in accordance with the present invention may have a molar ratio of aluminum from the aluminoxane to transition metal from 5:1 to 1000:1, preferably from 5:1 to 300:1, most preferably from 30:1 to 300:1, most desirably from 50:1 to 120:1.

In a further embodiment of the present invention the above noted catalyst may be supported on the above noted polymeric support. The catalyst may be loaded on the support to provide from 0.01 to 5, preferably from 0.05 to 2, most preferably from 0.1 to 1 weight % of transition metal per g of support.

In a further embodiment of the present invention the aluminoxane and the above noted catalyst may be premixed in the ratios specified above (e.g. from 5:1 to 1000:1, preferably from 5:1 to 300:1, most preferably from 30:1 to 300:1, most desirably from 50:1 to 120:1) and the resulting mixture may be supported on the functionalized polymeric catalyst support. These ratios may be broadly used with the catalyst and activator regardless of the sequence of deposition on the support.

In supporting the aluminoxane, catalyst or mixture on the polymeric support conventional techniques may be used. The support in a hydrocarbyl diluent may be contacted with the aluminoxane or the catalyst or a mixture thereof in the same or a compatible hydrocarbyl solvent or diluent. The resulting treated polymeric support may be separated from the bulk of the solvent or diluent by decanting or by drying typically from room temperature (20° C.) to about 60° C., preferably under vacuum (of less than about 10 torr) optionally while passing an inert gas such as nitrogen through the separated support and diluent/solvent. It should be noted the polymeric support may swell in the solvent or diluent but should not readily dissolve because it is crosslinked. It may be possible to spray dry the polymeric support together with the aluminoxane and or catalyst.

Inert hydrocarbon solvents typically comprise a $C_{4-12}$ hydrocarbon which may be unsubstituted or substituted by a $C_{1-4}$ alkyl group, such as butane, pentane, hexane, heptane, octane, cyclohexane, methylcyclohexane or hydrogenated naphtha. An additional solvent is Isopar E ($C_{8-12}$ aliphatic solvent, Exxon Chemical Co.).

The polymerization in accordance with the present invention may be conducted in a liquid phase as either a slurry or solution polymerization conducted in an inert diluent or solvent, or gas phase polymerization. The difference between slurry and solution polymerization being whether the resulting polymer is soluble in the liquid phase.

Solution and slurry polymerization processes are fairly well known in the art. These processes are conducted in the presence of an inert hydrocarbon solvent typically a $C_{4-12}$ hydrocarbon which may be unsubstituted or substituted by a $C_{1-4}$ alkyl group such as butane, pentane, hexane, heptane, octane, cyclohexane, methylcyclohexane or hydrogenated naphtha. An additional solvent is Isopar E ($C_{8-12}$ aliphatic solvent, Exxon Chemical Co.).

The polymerization may be conducted at temperatures from about 20° C. to about 250° C. Depending on the product being made, this temperature may be relatively low such as from 20° C. to about 180° C., typically from about 80° C. to 150° C. and the polymer is insoluble in the liquid hydrocarbon phase (diluent) (e.g. a slurry polymerization). The reaction temperature may be relatively higher from about 180° C. to 250° C., preferably from about 180° C. to 230° C. and the polymer is soluble in the liquid hydrocarbon phase (solvent). The pressure of the reaction may be as high as about 15,000 psig for the older high pressure processes or may range from about 15 to 4,500 psig.

In the gas phase polymerization of a gaseous mixture comprising from 0 to 15 mole % of hydrogen, from 0 to 30 mole % of one or more $C_{3-8}$ alpha olefins, from 15 to 100 mole % of ethylene, and from 0 to 75 mole % of an inert gas at a temperature from 50° C. to 120° C., preferably from 75° C. to about 110° C., and at pressures typically not exceeding 3447 kPa (about 500 psi), preferably not greater than 2414 kPa (about 350 psi).

Suitable olefin monomers may be ethylene and $C_{3-20}$ mono- and diolefins. Preferred monomers include ethylene and $C_{3-12}$ alpha olefins which are unsubstituted or substituted by up to two $C_{1-6}$ alkyl radicals. Illustrative non-limiting examples of such alpha olefins are one or more of propylene, 1-butene, 1-pentene, 4-methyl-1-pentene, 1-hexene, 1-heptene, 1-octene and 1-decene. The polymers prepared in accordance with the present invention have a good molecular weight. That is, weight average molecular weight (Mw) will preferably be greater than about 30,000 ranging up to $10^7$, preferably $10^5$ to $10^7$. Hydrogen may be used in the polymerization to control the molecular weight of the polymer.

The polyethylene polymers which may be prepared in accordance with the present invention typically comprise not less than 60, preferably not less than 70, most preferably not less than 80 weight % of ethylene and the balance of one or more $C_{4-10}$ alpha olefins, preferably selected from the group consisting of 1-butene, 1-hexene and 1-octene.

The present invention will now be illustrated by the following non-limiting examples. In the examples unless otherwise indicated parts means part by weight (i.e. grams) and percent means weight percent.

The following abbreviations are used in the Examples:

| | |
|---|---|
| AIBN = | 2,2'-Azobisisobutyronitrile |
| DVB = | divinyl benzene |
| HEMA = | 2-hydroxyethyl methacrylate |
| PTMA = | pentaerythritol trimethacrylate |
| PTMG = | poly (tetramethylene ether) glycol |

EXAMPLES

Example 1

Preparation of Support I

The suspension medium, 1.0 L water containing 95 g of acacia, was placed into a 2 L round bottom flask equipped with a stirrer and a reflux condenser. The round-bottom flask was placed into a thermostated vessel. A dispersed medium, which contained the monomers, was added to the 2 L flask at room temperature while stirring. The dispersed medium consisted of 7.5 g of HEMA, 31.5 g of styrene, 11 g of DVB, 40 g of toluene, 1.2 g of hydrophobic fumed silica and 0.7 g of AIBN. The mixture was then stirred at 400 rpm as the temperature was increased to 58° C.; the temperature was kept at 58° C. for 18 hours while stirring. The temperature was then raised to 68° C. and kept at this temperature for 16 hours while stirring. The mixture was cooled and the polymer beads, which had been formed, were filtered from the suspension by vacuum filtration. The polymer beads were washed several times with water and then dispersed in 300 mL of a 4N NaOH aqueous solution containing 50 mL of methanol. The suspension was shaken in a Parr shaker at room temperature for one day. The polymer beads were filtered from the suspension by vacuum filtration and washed several times with water. The beads were then soaked in methanol for several hours followed by several washings in water and then acetone. The beads were dried in air at room temperature and sieved. The 30–100 μm fraction was used as catalyst support.

Example 2

Preparation of Support II

The suspension medium, 1.0 L water containing 80 g of acacia, was placed into a 2 L round bottom flask equipped with a stirrer and a reflux condenser. The round bottom flask was placed into a thermostated vessel. A dispersed medium, which contained the monomers, was added to the 2 L flask which was at 50° C. while stirring. The dispersed medium consisted of 15 g of HEMA, 24 g of styrene, 11 g of DVB, 40 g of toluene, 5.0 g of PTMG and 0.7 g of AIBN. The mixture was then stirred at 350 rpm as the temperature was increased to about 60° C.; the temperature was kept at about 60° C. for 24 hours while stirring. The mixture was cooled and the polymer beads, which had been formed, were filtered from the suspension by vacuum filtration and were washed several times with water. The beads were then soaked in methanol for several hours followed by several washings in water and then acetone. The beads were dried in air at room temperature and sieved. The 35–80 μm fraction was used as catalyst support.

Example 3

Preparation of Support III

The suspension medium, 1.0 L water containing 80 g of acacia, was placed into a 2 L round bottom flask equipped with a stirrer and a reflux condenser. The round bottom flask was placed into a thermostated vessel. A dispersed medium, which contained the monomers, was added to the 2 L flask which was at 50° C. while stirring. The dispersed medium consisted of 25 g of HEMA, 14 g of styrene, 11 g of DVB, 40 g of toluene, 5.0 g of PTMG and 0.7 g of AIBN. The mixture was then stirred at 350 rpm as the temperature was increased to about 60° C.; the temperature was kept at about 60° C. for 24 hours while stirring. The mixture was cooled and the polymer beads, which had been formed, were filtered from the suspension by vacuum filtration and were washed several times with water. The beads were then soaked in methanol for several hours followed by several washings in water and then acetone. The beads were dried in air at room temperature and sieved. The 35–80 μm fraction was used as catalyst support.

Example 4

Preparation of Support IV

The suspension medium, 1.0 L water containing 80 g of acacia, was placed into a 2 L round bottom flask equipped with a stirrer and a reflux condenser. The round bottom flask was placed into a thermostated vessel. A dispersed medium, which contained the monomers, was added to the 2 L flask which was at 50° C. while stirring. The dispersed medium consisted of 30 g of HEMA, 9 g of styrene, 11 g DVB, 40 g of toluene, 5.0 g of PTMG, and 0.7 g of AIBN. The mixture was then stirred at 400 rpm as the temperature was increased to about 60° C.; the temperature was kept at about 60° C. for 24 hours while stirring. The mixture was cooled and the polymer beads, which had been formed, were filtered from the suspension by vacuum filtration and were washed several times with water. The beads were then soaked in methanol for several hours followed by several washings in water and then acetone. The beads were dried in air at room temperature and sieved. The 20–50 $\mu$m fraction was used as catalyst support.

Example 5

Preparation of Support V

The suspension medium, 1.0 L water containing 80 g of acacia, was placed into a 2 L round bottom flask equipped with a stirrer and a reflux condenser. The round bottom flask was placed into a thermostated vessel. A dispersed medium, which contained the monomers, was added to the 2 L flask which was at 60° C. while stirring. The dispersed medium consisted of 40 g of HEMA, 10 g of PTMA, 35 g of toluene, 6.0 g of hydrophobic 5 $\mu$m spherical silica particles, and 0.5 g of AIBN. The mixture was then stirred at 250 rpm as the temperature was increased to about 62° C.; the temperature was kept at about 62° C. for 18 hours while stirring. The temperature was increased to 80° C. and kept at 80° C. for an additional 12 hours while stirring at 250 rpm. The mixture was cooled and the polymer beads, which had been formed, were filtered from the suspension by vacuum filtration and were washed several times with water. The beads were then dispersed in 300 mL of an aqueous 4 N sodium hydroxide solution, containing 50 mL of methanol, and shaken in a Parr shaker at room temperature for 24 hours. The beads were filtered from the suspension by vacuum filtration and were washed several times with water. The beads were then soaked in methanol for several hours followed by several washings in water and then acetone. The beads were dried in air at room temperature and sieved. The 90–200 $\mu$m fraction was used as catalyst support.

Example 6

Preparation of Support VI

The suspension medium, 1.0 L water containing 80 g of acacia, was placed into a 2 L round bottom flask equipped with a stirrer and a reflux condenser. The round bottom flask was placed into a thermostated vessel. A dispersed medium, which contained the monomers, was added to the 2 L flask which was at 50° C. while stirring. The dispersed medium consisted of 58 g of styrene, 22 g DVB, 80 g of 2-butanol, and 1.6 g of AIBN. The mixture was then stirred at 350 rpm as the temperature was increased to about 60° C.; the temperature was kept at about 60° C. for 24 hours while stirring. The mixture was cooled and the polymer beads, which had been formed, were filtered from the suspension by vacuum filtration and were washed several times with water. The beads were then soaked in methanol for several hours followed by several washings in water and then acetone. The beads were dried in air at room temperature and sieved. The 120–400 $\mu$m fraction was used as catalyst support.

Example 7

Preparation of Support VII

The suspension medium, 1.0 L water containing 100 g of acacia, was placed into a 2 L round bottom flask equipped with a stirrer and a reflux condenser. The round bottom flask was placed into a thermostated vessel. A dispersed medium, which contained the monomers, was added to the 2 L flask which was at 50° C. while stirring. The dispersed medium consisted of 39 g of styrene, 11 g DVB, 40 g of toluene, 1.6 g of hydrophobic silica particles, 1 mL of chloroform, and 0.7 g of AIBN. The mixture was then stirred at 400 rpm as the temperature was increased to about 60° C.; the temperature was kept at about 60° C. for 24 hours while stirring. The mixture was cooled and the polymer beads, which had been formed, were filtered from the suspension by vacuum filtration and were washed several times with water. The beads were then dispersed in 300 mL of an aqueous 4 N sodium hydroxide solution, containing 50 mL methanol, and shaken in a Parr shaker at room temperature for 24 hours. The beads were filtered from the suspension by vacuum filtration and were washed several times with water. The beads were then soaked in methanol for several hours followed by several washings in water and then acetone followed by drying in air. The beads were dried in air at room temperature and sieved. The 80–400 $\mu$m fraction was used as catalyst support.

Example 8

Preparation of Supported Catalyst A

The Support I prepared in Example 1 was dried under a high vacuum at room temperature for 4 hours, 80° C. for 5 hours and further at room temperature overnight, with intermittent purging with nitrogen gas.

In a flask were placed 5.55 g of a MAO solution (4.47 weight % Al in toluene) and 15 mL of toluene. While the solution was stirred at room temperature, 1.5 g of Support I was added slowly. The mixture was stirred for 16 hours at room temperature. To this mixture, 0.034 g of tri-tert-butyl phosphiniminate indenyl titanium dissolved in 4 mL of toluene was added. The mixture was stirred for 2 hours at room temperature and further for 2 hours at 45° C. The solvent was then removed by applying a high vacuum, to provide a free-flowing powder.

Example 9

Preparation of Supported Catalyst B

Same as Example 8 except that the Support II obtained in Example 2 was used.

Example 10

Preparation of Supported Catalyst C

Same as Example 8 except that the Support III obtained in Example 3 was used.

Example 11

Preparation of Supported Catalyst D

Same as Example 8 except that the Support IV obtained in Example 4 was used.

Example 12

Preparation of Supported Catalyst E

Same as Example 8 except that the Support V obtained in Example 5 was used.

Example 13

Preparation of Supported Catalyst F

Same as Example 8 except that the Support VI obtained in Example 6 was used.

Example 14

Preparation of Supported Catalyst G

Same as Example 8 except that the Support VII obtained in Example 7 was used.

Example 15

Preparation of Supported Catalyst H

Same as Example 8, except that a commercial styrene-divinylbenzene copolymer (Chromosorb 101 purchased from Chromatographic Specialties Inc.) was used.

Example 16

Preparation of Supported Catalyst I

Same as Example 8, except that an XPO-2408 silica manufactured by W. R. Grace Davison that was dehydrated by heating at 200° C. under air for 2 hours and further at 600° C. under nitrogen for 6 hours was used.

Example 17

Preparation of Supported Catalyst J

The Support I obtained in Example 1 was dried under a high vacuum for 4 hours at room temperature, 80° C. for 5 hours and further at room temperature overnight, with intermittent purging with nitrogen gas.

In a flask, 58 mg of bis(n-butyl cyclopentadienyl) zirconium was dissolved in 25 mL of toluene. To this solution was added 1.27 g of a MAO solution (13.75 weight % Al in toluene). The mixture was stirred at room temperature for 30 minutes. The solution was then added to 1.38 g of the Support I in Example 1. The mixture was stirred at 45° C. for 90 minutes. The solvent was removed by applying a high vacuum to provide a free-flowing powder.

Example 18

Preparation of Supported Catalyst K

Same as Example 17 except that the Support VII obtained in Example 7 was used.

Examples 19–24

Copolymerization of Ethylene and 1-Hexene

In a 2 liter autoclave reactor, 160 g of NaCl was added for use as seedbed. The reactor was heated to 100° C. and thoroughly purged with ethylene gas. Approximately 0.40 mL of tri-isobutyl aluminum in n-hexane solution (0.40 mmol) and 3 mL of 1-hexene were injected into the reactor. After the reactor was cooled down to 90° C. and pressurized with 100 psig of ethylene, 10~30 mg of a supported catalyst A~E or J was added and the reactor was pressurized with 200 psig of ethylene. The polymerization was proceeded for 60 minutes with temperature maintained at 90° C. and pressure at 200 psig by feeding ethylene continuously into the reactor. The reaction was terminated by rapidly venting the reaction gases and cooling the reactor to room temperature. The polymer was recovered and the catalyst activity (gram of polymer/gram of catalyst) was determined (Table 2).

Comparative Example 1

Same as Examples 19, but the Supported Catalyst F prepared in Example 13 was used.

Comparative Example 2

Same as Examples 19, but the Supported Catalyst G prepared in Example 14 was used.

Comparative Example 3

Same as Examples 19, but the Supported Catalyst H prepared in Example 15 was used.

Comparative Example 4

Same as Examples 19, but the Supported Catalyst I prepared in Example 16 was used.

Comparative Example 5

Same as Examples 19, but the Supported Catalyst K prepared in Example 18 was used.

TABLE 1

Polymer Supports

| Example | Support | Composition of Comonomer Feed |
|---|---|---|
| 1 | I | 15% HEMA, 63% styrene, 22% divinyl benzene |
| 2 | II | 30% HEMA, 48% styrene, 22% divinyl benzene |
| 3 | III | 50% HEMA, 28% styrene, 22% divinyl benzene |
| 4 | IV | 60% HEMA, 18% styrene, 22% divinyl benzene |
| 5 | V | 80% HEMA, 20% pentaerythritol trimethacrylate |
| 6 | VI | 73% styrene, 27% divinyl benzene |
| 7 | VII | 78% styrene, 22% divinyl benzene |

TABLE 2

Effect of the HEMA Level on the Catalyst Activity

| Example | Catalyst | Support | Catalyst Activity g Polymer/g Catalyst |
|---|---|---|---|
| 19 | A | I | 3,157 |
| 20 | B | II | 2,926 |
| 21 | C | III | 2,130 |
| 22 | D | IV | 2,167 |
| 23 | E | V | 410 |
| Comparative Example 1 | F | VI | 210 |
| Comparative Example 2 | G | VII | 350 |
| Comparative Example 3 | H | Chromosorb 101 | 1,239 |
| Comparative Example 4 | I | Davison XPO-2408 silica | 2,455 |
| 24 | J | I | 2,206 |
| Comparative Example 5 | K | VII | 638 |

The results show the following. Using the supports of the present invention, it is possible to prepare a supported single-site type catalyst having a much higher activity than that of the same catalyst supported on polymer particles containing no functional groups.

With levels of cross-linking agent of about 20 to 25% and HEMA levels from 15 to 60 weight %, the supported catalyst prepared according to the invention show good activities that are comparable or better than that of the same catalyst supported on silica.

What is claimed is:

1. A process for the polymerization of one or more olefins in the presence of a catalyst system catalyst system comprising a co-catalyst of the formula $R^1{}_2AlO(R^1AlO)_mAlR^1{}_2$ wherein each $R^1$ is independently selected from the group consisting of $C_{1-4}$ hydrocarbyl radicals and m is from 3 to 30, to provide from 0.01 to 0.8 g per g of support and a catalyst of the formula:

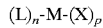

wherein M is a transition metal selected from the group consisting of Ti, V, Zr, Hf, Cr, Fe, Co, Ni and Pd; L is a monoanionic ligand independently selected from the group consisting of a cyclopentadienyl-type ligand, a bulky heteroatom ligand and a phosphinimine ligand; X is an activatable ligand; n may be 2 or 3; and p may be 1 or 2; provided that the sum of n+p equals the valence state of M, only one cyclopentadienyl type ligand may be present in the catalyst, and further provided that two L ligands may be bridged by a silyl radical or a $C_{1-4}$ alkyl radical to provide a molar ratio of aluminum to transition metal from 5:1 to 1000:1, said support comprising the suspension or emulsion polymerization product of a feedstock substantially consisting of:

(i) from 0 to 95 weight % of one or more $C_{4-12}$ vinyl monomers;

(ii) from 50 to 2 weight % of a crosslinking agent; and (iii) from 70 to 3 weight % of a functionalized monomer selected from the group consisting of $C_{1-8}$ hydroxy esters of $C_{3-6}$ ethylenically unsaturated carboxylic acids, and chloride derivatives thereof; the sum of the weight % of said monomers being 100 weight %, and having a particle size from 10 to 300 microns, surface area from 100 to 1500 m²/g and a pore volume of at least 0.6 cc/g of support.

2. A process for the polymerization of one or more olefins according to claim 1, wherein in the co-catalyst $R^1$ is a methyl radical; the catalyst has the formula has the formula:

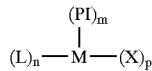

wherein M is a transition metal; Pl is a phosphinimine ligand; L is a monoanionic ligand selected from the group consisting of a cyclopentadienyl-type ligand selected from the group consisting of a cyclopentadienyl radical, an indenyl radical and a fluorenyl radical which are unsubstituted or up to fully substituted by one or more substituents selected from the group consisting of a fluorine atom, a chlorine atom; $C_{1-4}$ alkyl radicals; and a phenyl or benzyl radical which is unsubstituted or substituted by one or more fluorine or chlorine atoms or a bulky heteroatom ligand; X is an activatable ligand; m is 1 or 2; n is 0 or 1; and p is an integer and the sum of m+n+p equals the valence state of M, to provide a molar ratio of aluminum to transition metal from 20:1 to 300:1; and in the feedstock for the support:

(i) vinyl monomer is styrene and is present in an amount from 60 to 80 weight %;

(ii) the crosslinking agent is divinyl benzene and is present in an amount from 25 to 10 weight %; and (iii) the functionalized monomer is selected from the group consisting of 2-hydroxyethyl acrylate and 2-hydroxyethyl methacrylate and is present in an amount from 50 to 15 weight %.

3. The process according to claim 2 which is a gas phase process.

4. The process according to claim 2 which is a slurry phase process.

5. The process according to claim 2 which is a solution phase process.

6. The gas phase process according to claim 3 wherein at least the co-catalyst is on the support.

7. The gas phase process according to claim 3 wherein at least the catalyst is on the support.

8. The gas phase process according to claim 3 wherein both the catalyst and the co-catalyst are on the support.

9. The slurry phase process according to claim 4 wherein at least the co-catalyst is on the support.

10. The slurry phase process according to claim 4 wherein at least the catalyst is on the support.

11. The slurry phase process according to claim 4 wherein both the catalyst and the co-catalyst are on the support.

12. The slurry phase process according to claim 5 wherein at least the co-catalyst is on the support.

13. The slurry phase process according to claim 5 wherein at least the catalyst is on the support.

14. The slurry phase process according to claim 5 wherein both the catalyst and the co-catalyst are on the support.

* * * * *